(12) United States Patent
Warner

(10) Patent No.: US 7,007,930 B1
(45) Date of Patent: Mar. 7, 2006

(54) DUAL FUEL FEED SYSTEM CARBURETOR

(75) Inventor: Donald W. Warner, Cass City, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 165 days.

(21) Appl. No.: 10/720,359

(22) Filed: Nov. 24, 2003

(51) Int. Cl.
*F02M 7/04* (2006.01)

(52) U.S. Cl. .................. 261/18.3; 261/22; 261/66; 261/121.3; 261/DIG. 82

(58) Field of Classification Search ............... 261/18.3, 261/22, 66, 121.3, DIG. 82
See application file for complete search history.

(56) References Cited

U.S. PATENT DOCUMENTS

| | | | | |
|---|---|---|---|---|
| 1,826,061 A | * | 10/1931 | Ensign | 261/41.5 |
| 3,414,242 A | * | 12/1968 | Bouteleux | 261/18.3 |
| 4,045,521 A | * | 8/1977 | Lemonnier et al. | 261/41.1 |
| 4,354,477 A | * | 10/1982 | Sprick | 123/575 |
| 4,382,047 A | * | 5/1983 | Brown et al. | 261/41.5 |
| 4,584,981 A | * | 4/1986 | Tanabe et al. | 123/472 |

FOREIGN PATENT DOCUMENTS

JP  55-98648  *  7/1980  .......... 261/DIG. 82

* cited by examiner

*Primary Examiner*—Richard L. Chiesa
(74) *Attorney, Agent, or Firm*—Reising, Ethington, Barnes, Kisselle, P.C.

(57) ABSTRACT

A carburetor dual fuel feed system has a primary passage for flowing fuel into a venturi of a fuel-and-air mixing passage, and a supplemental channel flowing fuel into a mixing passage upstream region. Sizing of the primary passage and channel with respect to pressure dynamics of each region disassociates low from high power engine fuel calibration. This disassociation ultimately achieves a leaner fuel-and-air mixture flow during low power conditions which reduces carbon monoxide emissions, and achieves a richer mixture flow during high engine power conditions which reduces NOx emissions. During low engine power conditions, substantially all of the fuel which mixes with clean air flowing through the venturi of the mixing passage flows from the primary passage. During high engine power conditions, supplemental fuel flow into the mixing passage is induced by a vacuum created about a nozzle of the channel.

25 Claims, 3 Drawing Sheets

DUAL FUEL FEED SYSTEM CARBURETOR

FIELD OF THE INVENTION

The present invention relates generally to a carburetor for a combustion engine and more particularly to a dual fuel feed system of the carburetor.

BACKGROUND OF THE INVENTION

Small internal combustion engines, utilize carburetors to deliver a mixture of fuel-and-air to an intake manifold of the engine. The carburetor body typically carries a fuel-and-air mixing passage which is restricted by a venturi between an inlet or upstream region and a downstream region of the passage. Clean air at substantially atmospheric pressure typically flows from an air filter and through the upstream region where the air flow rate is controlled by a choke valve disposed pivotally in the upstream region. Clean air flowing past the choke valve increases in velocity as it enters the venturi region thus creating a vacuum or sub-atmospheric condition at the venturi region which causes liquid fuel to flow from a fuel chamber at atmospheric pressure, through a primary fuel feed passage and into the venturi region from a fuel orifice or nozzle disposed at the radially inner most location of the venturi. The entering fuel mixes with the incoming clean air and flows as a mixture through the downstream region of the fuel-and-air mixing passage. The volumetric flow rate of the fuel-and-air mixture entering the engine intake manifold is controlled generally by a throttle valve disposed pivotally in the downstream region of passage. When the engine is idling or at low power conditions, the throttle valve is substantially closed thus limiting the rate of air flowing through the mixing passage which reduces the vacuum at the venturi region and in-turn reduces the rate of fuel flowing through the primary fuel feed passage.

During design and/or manufacturing of the carburetor, the primary fuel feed passage (i.e. diameter and/or flow restrictor size) must be properly sized or calibrated in conjunction with changing dynamics within the mixing passage to produce a smooth running engine throughout its operating power range, and which meets government regulatory emission requirements. For instance, if the engine runs too rich at idle, excessive carbon monoxide, CO, is expelled through the engine exhaust, yet if the engine runs too lean at wide open throttle or higher power demand conditions excessive NOx emissions are produced. Unfortunately, via calibration of the primary fuel feed passage alone, reducing NOx emissions at high power operating conditions by increasing fuel flow increases CO emissions at lower power conditions, and reducing CO emissions at low power conditions by reducing fuel flow increases NOx emissions during high power conditions. Moreover, such calibration restraints have the effect of reducing the overall fuel efficient power range of an operating engine in order to meet government regulatory emission requirements.

SUMMARY OF THE INVENTION

A dual fuel feed system integrated into a combustion engine carburetor promotes a manufacturer's ability to accurately calibrate fuel flow entering a carburetor fuel-and-air mixing passage over the full power range of an operating engine thus reducing NOx and CO emissions while maintaining a smooth running engine. The dual fuel feed system disassociates low from high power engine calibration thus achieving a leaner mixture of fuel-and-air at low power which reduces carbon monoxide emissions and achieving a relatively richer mixture of fuel-and-air for high engine power conditions which reduces NOx emissions. During idle and low power engine operating conditions, substantially all of the fuel which mixes with clean air flowing through a venturi region of the fuel-and-air mixing passage flows from a calibrated primary fuel feed passage which extends between the mixing passage at the venturi and a fuel chamber held at substantially atmospheric pressure. During generally high power operating engine conditions, supplemental fuel enters the fuel-and-air mixing passage preferably via a nozzle projecting into the mixing passage upstream of the venturi. This additional fuel flow is induced by a vacuum created by an appreciable high flow rate of clean air about the nozzle and the sudden change in direction of clean air flow at the inlet of the mixing passage. The nozzle communicates with a fuel channel generally carried by the carburetor body and which communicates with the fuel chamber independently of the primary fuel feed passage.

Preferably disposed operatively in the fuel channel is a biased closed check valve which prevents fuel flow during low power conditions and delays fuel flow through the nozzle until a specified vacuum level is reached. Preferably, an air bleed aperture communicates with a fuel channel portion located between the nozzle and the check valve to delay supplemental fuel flow through the nozzle until higher engine power operating conditions are reached, and to add air to the incoming supplemental fuel which improves mixing of the supplemental fuel and clean air within the mixing passage thus improving engine combustion efficiency.

Objects, features and advantages of this invention include providing a smooth running engine having reduced CO emissions at low power operating conditions and reduced NOx emissions at high power operating conditions. Moreover, because the fuel flow calibration is disassociated between low and high power, the carburetor can be calibrated by the manufacturer over a wider power range thus effectively increasing the number of different engine applications which can utilize the dual fuel feed system carburetor. Yet further, the carburetor is compact in construction, of relatively simple design, extremely low cost when mass produced, and is rugged, durable, reliable, requires little maintenance and no adjustment in use, and in service has a long useful life.

BRIEF DESCRIPTION OF THE DRAWINGS

These and other objects, features and advantages of this invention will be apparent from the following detailed description of the preferred embodiment and best mode, appended claims, and accompanying drawings in which:

DETAILED DESCRIPTION OF THE PREFERRED EMBODIMENTS

Figure 1:
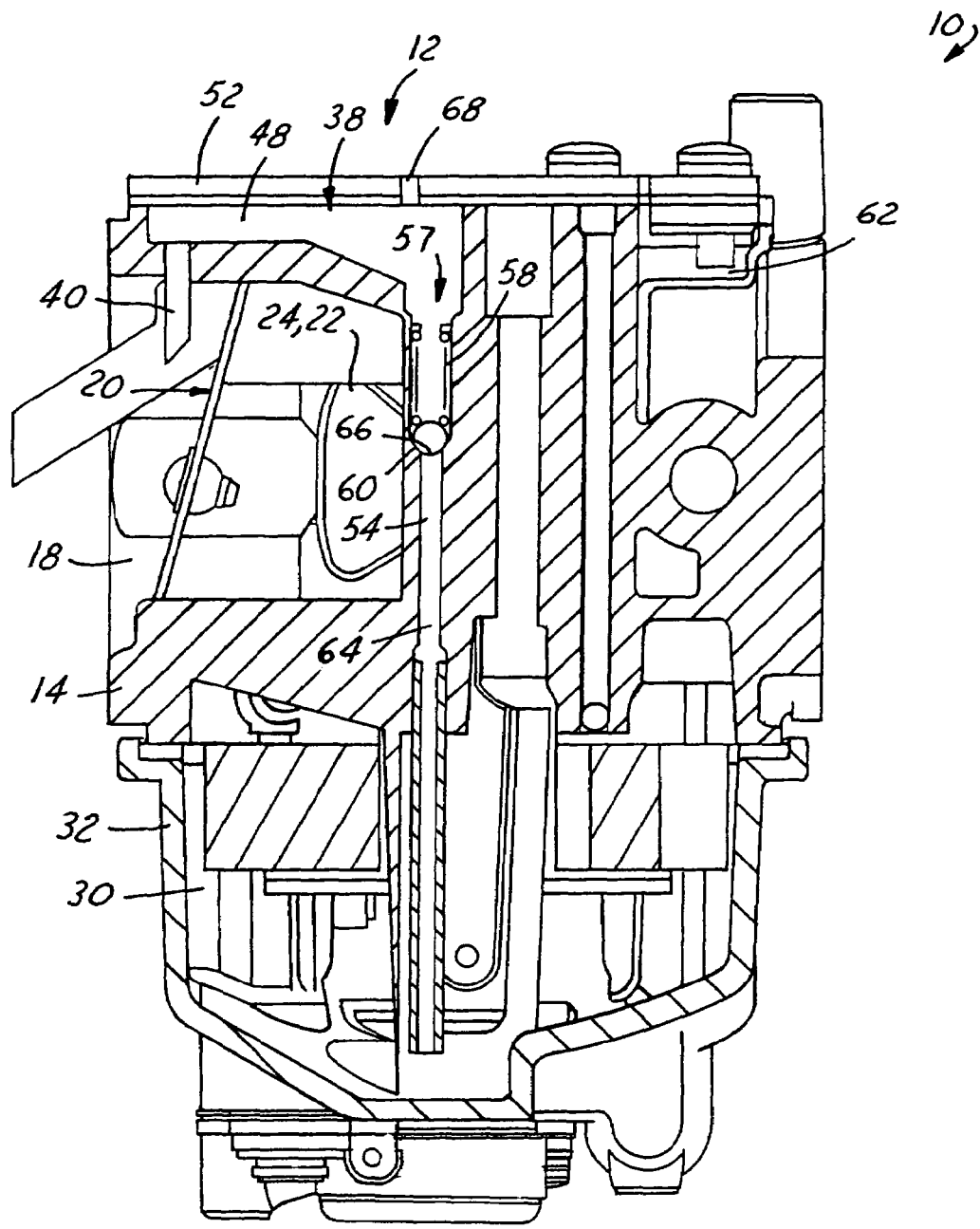
FIG. 1 is a bi-planar cross section view of a dual fuel feed system carburetor of the present invention.
Figure 2:
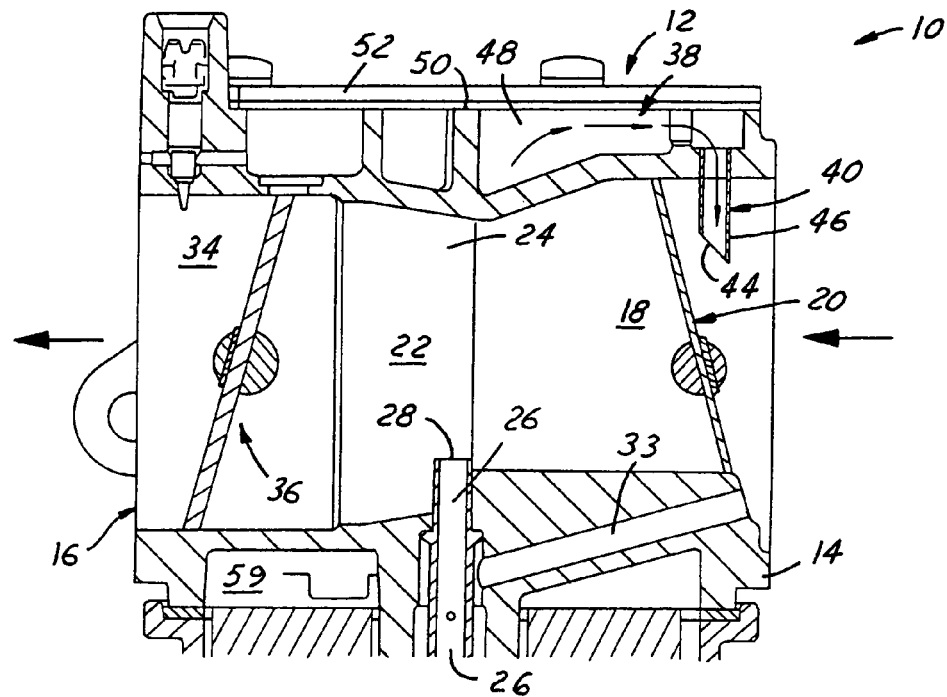
FIG. 2 is a partial cross section view of the dual fuel feed system carburetor illustrating a supplemental fuel nozzle within a fuel-and-air mixing passage.
Figure 3:
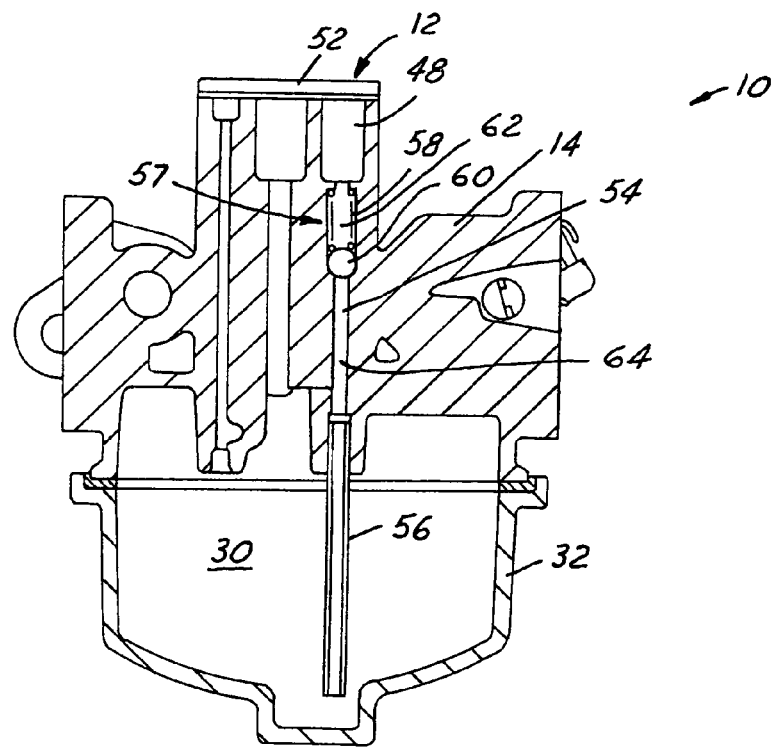
FIG. 3 is a cross section view of the dual fuel feed system carburetor taken along a plane disposed substantially parallel to and laterally spaced from the cross sectional plane of FIG. 2 and illustrating a fuel channel.

Referring in more detail to the drawings, FIGS. 1–5 illustrate a carburetor 10, preferably of a float bowl-type design, which is preferably utilized on a small displacement, engine. The carburetor 10 has a dual fuel feed system 12, of the present invention, which disassociates low engine power fuel delivery calibration from high engine power fuel delivery calibration, which is performed by the manufacturer for a specified engine application. This disassociation tightens fuel delivery calibration tolerances enabling the engine to run with a leaner mixture of fuel-and-air at idle and low power operating conditions for the reduction of carbon monoxide emissions, and it also enables the flow of a richer mixture of fuel-and-air to the engine via the carburetor 10 at high power operating conditions thus reducing NOx emissions or maintaining NOx emissions at minimal levels.

Communicating through a body 14 of the carburetor 10 is a fuel-and-air mixing passage 16 generally exposed, via an engine intake manifold (not shown), to a pulsating sub-atmospheric pressure induced by at least one reciprocating piston of the operating combustion engine. This vacuum causes clean air to flow from an air filter, through the fuel-and-air mixing passage 16, through the engine intake manifold and into a combustion chamber of the engine (not shown). In the carburetor 10, the clean air first flows through an inlet or upstream region 18 of the mixing passage 16 and past a butterfly-type choke valve 20 disposed operatively in the upstream region 18 for restricting air flow during cold engine starts. The clean air then flows through a vacuum inducing venturi region 22 defined by a venturi surface 24 carried by the body 14 which communicates with an emulsifying primary fuel feed passage 26 via a main or high speed fuel aperture or nozzle 28 disposed at the venturi region 22. The flowing air generally creates a relatively strong vacuum at the venturi region 22 causing an emulsion of liquid fuel-and-air to flow upward from a fuel chamber 30, preferably defined by a float bowl 32 of the carburetor 10, wherein it emulsifies with air flowing from a passage 33 and further mixes with the clean air flowing through the venturi region 22. The resulting fuel-and-air mixture then flows through a downstream region 34 of the fuel-and-air mixing passage 16 and past a butterfly-type throttle valve 36 disposed operatively in the downstream region 34 for generally controlling the flow rate of the fuel-and-air mixture entering the intake manifold of the engine.

The fuel chamber 30 is substantially held at atmospheric pressure and although illustrated as a float bowl type design, the dual fuel feed system 12 can also be utilized with a carburetor that utilizes a fuel metering diaphragm design as the fuel chamber.

Figure 4:
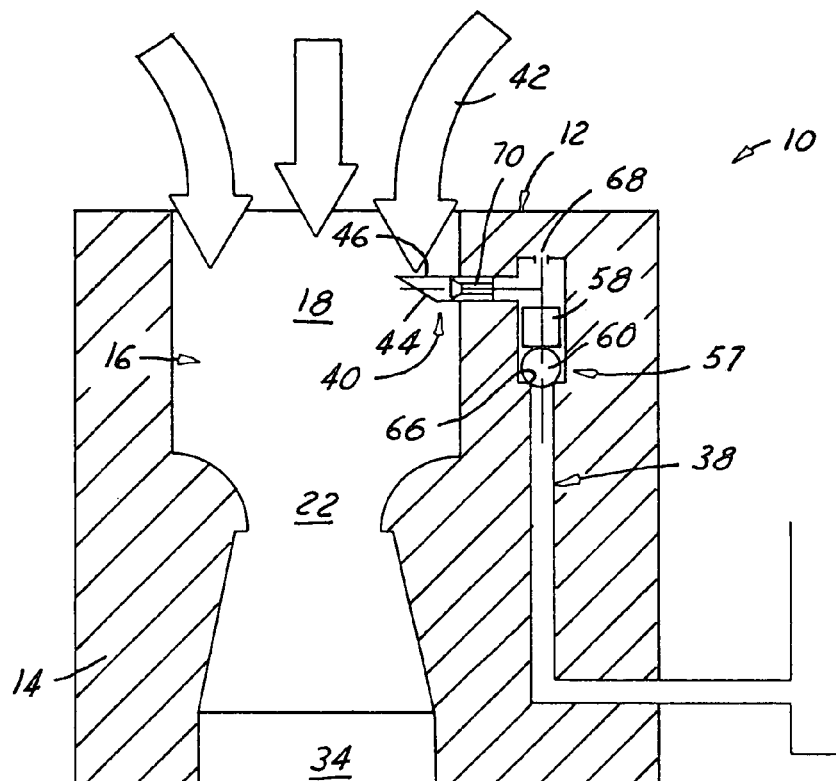
FIG. 4 is a schematic sectional view of the dual fuel feed system carburetor.

The second or supplemental fuel feed passage of the dual fuel feed system 12 has a supplemental fuel channel 38 which communicates between the fuel chamber 30 and a nozzle 40 disposed upstream of the choke valve 20 within the upstream region 18 of the fuel-and-air mixing passage 16. A localized sub-atmospheric pressure condition created in the vicinity of the supplemental nozzle 40 causes fuel to flow from the fuel chamber 30, through the nozzle 40 and into the upstream region 18 generally upstream of the choke valve 20. This localized sub-atmospheric pressure condition is created by a sudden change in air flow direction (designated by arrow 42) at the inlet of the upstream region 18, as best shown in FIG. 4. Moreover, when the nozzle 40 has a chamfered or oblique end 44 opening downstream and defined and sheltered by a back side 46 of the nozzle 40, an increased vacuum signal is created by the diversion of air flow traveling around the back side 46 of the nozzle 40. Generally, the greater the angle of the chamfered end 44, the greater the vacuum signal and the greater fuel flow.

For ease of manufacturing, the supplemental fuel channel 38 has a compartment portion 48 defined by an outer surface 50 of the body 14 and a lid 52 of the carburetor 10 fastened sealably to the body 14. A bore portion 54 of the channel 38 is carried by the body 14 and extends generally downward from the compartment portion 48 to communicate with a tubular portion defined by a hollow dip tube 56 which projects downward from the body 14 and into the liquid fuel in the fuel chamber 30.

A check valve 57 of the dual fuel feed system 12 is situated operatively in the bore portion 54 of the fuel channel 38 and acts to delay fuel flow through the supplemental fuel channel 38 until an appreciable air flow in the mixing passage 16 is achieved at higher power operating conditions. Moreover, the check valve 57 acts to eliminate fuel leakage into the fuel-and-air mixing passage 16 during idle or low power conditions wherein all or a substantial portion of fuel flowing into the intake manifold flows from an idle circuit 59 carried by the body 14 and configured near the throttle valve 36. The delay is dependent upon the magnitude of the biasing force tending to close the check valve 57 which is preferably created by a spring 58 and ball 60 combination. The spring 58 and ball 60 are received in a valve chamber 62 or upper section of the bore portion 54 which has a greater diameter than an upstream or lower section 64 of the bore portion 54 disposed concentrically below. The ball 60 sealably engages an annular surface or valve seat 66 when the check valve 57 is in a closed position.

As the air flow rate increases about the nozzle 40 of the supplemental fuel channel 38 with increasing engine power, the resulting increase in vacuum induced on the downstream side of the ball 60 creates a suction or force which opens the valve 57 by overcoming the biasing force of the spring 58 and the weight of the ball 60 thus causing the ball to lift from the seat 66 and the spring 58 to compress. With the check valve 57 held in the open position by the vacuum force, fuel flows from the fuel chamber 30 and into the upstream region 18 of the fuel-and-air mixing passage 16 during high power operating conditions of the engine. Because the vacuum induced at the nozzle 40 of the supplemental fuel channel 38 is generally independent of the vacuum created at the venturi region 22, the fuel flowing through the primary fuel feed passage 26 is not substantially reduced when fuel flows through the supplemental fuel channel 38, therefore, the exiting fuel-and-air mixture is richer for high power running conditions as opposed to low power or idle conditions.

The timing or sequencing of when the check valve 57 opens along an operating power curve of the engine preferably is fine-tuned by the sizing of an air bleed aperture 68 disposed between the nozzle 40 and check valve 57 of the supplemental fuel channel 38. As illustrated in FIG. 1, the air bleed aperture 68 extends through the lid 52 and thus communicates between the exterior environment at atmospheric pressure and the compartment portion 48 of the supplemental fuel channel 38 defined between the outer surface 50 of the body 14 and the lid 52. The larger the aperture 68, the greater the vacuum bleed, thus increasing the delay time before the check valve 57 opens to allow supplemental fuel to produce an emulsion to flow. The aperture 68 also serves to add air to the incoming liquid fuel to produce an emulsion that improves mixing of fuel and clean air within the mixing passage 16 thus promoting more efficient combustion within the engine.

The compartment portion 48 communicates directly between the upper section of the bore portion 54 and the nozzle 40. Removal of the lid 52 exposes the spring 58 and ball 60 of the check valve 57 for visual inspection and maintenance. Moreover, during manufacturing and prior to assembly of the lid 52 and check valve 57, the seat 66 carried by the body 14 is easily coined by a hardened and polished tool to create a smooth surface for superior sealing capability between the ball 60 and seat 66 when the check valve 57 is closed.

Figure 5:
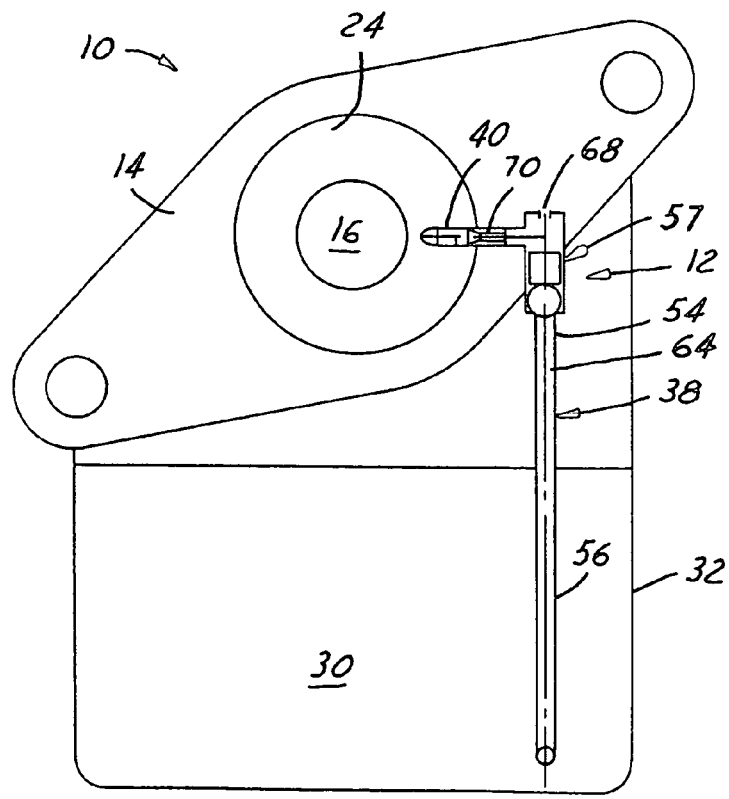
FIG. 5 is a schematic sectional view of the dual fuel feed system carburetor rotated generally ninety degrees from FIG. 5.

Referring to FIGS. 4 and 5, for versatile dual fuel feed system designs, the nozzle 40 carries an exchangeable flow restrictor 70 which limits the maximum flow rate of the supplemental fuel contribution into the upstream region 18 of the fuel-and-air mixing passage 16. However, the nozzle 40 can also be sized independently for a particular engine application thus eliminating the need for a restrictor 70. During high power operating conditions, the percentage of total fuel flowing into the engine which is supplied to the mixing passage 16 from the supplemental fuel channel 38 is usually less than twenty percent, desirably less than ten percent and preferably between about four to eight percent. Generally, fuel will not flow through the supplemental fuel channel 38 of the dual fuel feed system 12 until the actual engine load exceeds approximately fifty percent of the maximum operating load of the engine.

While the forms of the invention herein disclosed constitute a presently preferred embodiment, many others are possible. It is not intended herein to mention all the possible equivalent forms, modifications or ramifications of the invention. It is understood that terms used herein are merely descriptive, rather than limiting, and that various changes may be made without departing from the spirit or scope of the invention as defined by the following claims.

We claim:

1. A carburetor for a combustion engine comprising:
a body;
a fuel-and-air mixing passage through the body, the fuel-and-air mixing passage having an upstream region, a downstream region and a venturi region disposed between the upstream and downstream regions;
a choke valve operatively in the upstream region of the mixing passage;
a fuel chamber at least in-part carried by the body; and
a dual fuel feed system having:
a primary fuel feed passage at least in-part carried by the body and communicating between the venturi region and the fuel chamber for flowing fuel into the venturi region for mixing with air flowing past the choke valve and through the venturi region when the engine is operating at above idle speed conditions, and
a separate supplemental fuel channel at least in-part carried by the body and communicating between the upstream region and the fuel chamber supplying fuel into the upstream region for mixing with air flowing through the fuel-and-air mixing passage when the engine is operating only at high power conditions.

2. The carburetor set forth in claim 1 comprising a check valve yieldingly biased toward a closed position and constructed and arranged to close to prevent fuel flow through the supplemental fuel channel when the engine is operating at low power conditions.

3. The carburetor set forth in claim 1 comprising a fuel float bowl engaged to the body and in-part defining the fuel chamber.

4. The carburetor set forth in claim 1 wherein the fuel chamber is normally at atmospheric pressure.

5. The carburetor set forth in claim 2 comprising:
a nozzle projecting into the upstream region;
wherein the nozzle in-part carries the supplemental fuel channel; and
an air bleed communicating with the fuel channel and disposed between the nozzle and the check valve for delaying supplemental fuel flow into the upstream region and for introducing air into the supplemental fuel to promote mixing with additional air slowly through the mixing passage.

6. The carburetor set forth in claim 5 wherein the nozzle is disposed upstream of the choke valve.

7. The carburetor set forth in claim 6 wherein the nozzle is sloped and has a back side for directing air flow around the nozzle creating a localized vacuum condition in the nozzle.

8. The carburetor set forth in claim 2 wherein the fuel channel is carried in-part by a tube projecting downward into the fuel chamber from the body.

9. The carburetor set forth in claim 2 comprising:
a compartment portion of the fuel channel communicating directly with the nozzle;
a lid engaged sealably to the body; and
wherein the compartment is defined between the body and the lid.

10. The carburetor set forth in claim 9 comprising an air bleed extending through the lid and communicating between the compartment portion and atmosphere.

11. The carburetor set forth in claim 10 wherein the air bleed is openly connected between the nozzle and the check valve.

12. The carburetor set forth in claim 9 comprising:
a bore portion of the fuel channel defined by the body and communicating between the compartment portion and a tubular portion defined by the tube; and
wherein the check valve is orientated in the bore portion.

13. The carburetor set forth in claim 2 wherein the check valve has a ball yieldingly biased against an annular seat carried by the body.

14. The carburetor set forth in claim 12 wherein the check valve has a ball yieldingly biased against an annular seat carried by the body.

15. The carburetor set forth in claim 14 comprising a spring of the check valve disposed above the ball within the bore portion and being in contact with the ball to bias the check valve in the closed position.

16. The carburetor set forth in claim 14 comprising:
an upper section of the bore portion communicating directly with the compartment portion;
a lower section of the bore portion disposed concentrically to the upper section and having a diameter which is less than the upper section; and
wherein the annular seat is disposed between the upper and lower sections and is defined radially by the difference in diameters of the upper and lower sections.

17. The carburetor set forth in claim 5 comprising a fuel flow restrictor orientated in the nozzle.

18. The carburetor set forth in claim 1 wherein no supply of fuel flows through the supplemental fuel channel when the engine is operating at less than fifty percent of maximum operating power.

19. The carburetor set forth in claim 18 wherein the supplemental fuel channel supplies not more than twenty percent of the total fuel flow.

20. The carburetor set forth in claim 1 wherein the supplemental fuel channel supplies not more than ten percent of the total fuel flow.

21. The carburetor set forth in claim 1 wherein the supplemental fuel channel supplies between four to eight percent of total fuel flow at engine operating conditions in excess of fifty percent power.

22. A dual fuel feed system of a carburetor having a body, a fuel-and-air mixing passage through the body for supplying a mixture of fuel-and-air to a combustion engine, a choke valve operatively in an upstream region of the mixing passage for controlling air flow through the mixing passage during cold starting of the engine, a throttle valve operatively in a downstream region of the mixing passage for controlling engine power by controlling the amount of fuel-and-air mixture entering the engine, a venturi region of the mixing passage disposed between the upstream and downstream regions, and a fuel chamber at least in-part carried by the body for supplying fuel to the mixing passage, the dual fuel feed system comprising:

a primary fuel feed passage at least in-part carried by the body and communicating between the venturi region and the fuel chamber for flowing fuel into the venturi region for mixing with air flowing past the choke valve and through the venturi region when the engine is operating at above idle speed conditions; and a separate supplemental fuel channel at least in-part carried by the body, and communicating between the upstream region and the fuel chamber supplying fuel into the upstream region for mixing with air flowing through the mixing passage when the engine is operating only at high power conditions.

23. The dual fuel feed system set forth in claim 22 comprising a nozzle projecting transversely into the upstream region and disposed adjacent to an inlet of the mixing passage in a sub-atmospheric pressure area caused by a change in direction of incoming air flow.

24. A dual fuel feed system of a carburetor having a body, a fuel-and-air mixing passage through the body for supplying a mixture of fuel-and-air to a combustion engine, a choke valve operatively in an upstream region of the mixing passage for controlling air flow through the mixing passage during cold starting of the engine, a throttle valve operatively in a downstream region of the mixing passage for controlling engine power by controlling the amount of fuel-and-air mixture entering the engine, a venturi region of the mixing passage disposed between the upstream and downstream regions, and a fuel chamber at least in-part carried by the body for supplying fuel to the mixing passage, the dual fuel feed system comprising:

a primary fuel feed passage at least in-part carried by the body and communicating between the venturi region and the fuel chamber for flowing fuel into the venturi region for mixing with air flowing past the choke valve and through the venturi region when the engine is operating at above idle speed conditions;

a supplemental fuel channel at least in-part carried by the body, and communicating between the upstream region and the fuel chamber supplying fuel into the upstream region for mixing with air flowing through the mixing passage when the engine is operating only at high power conditions; and a check valve disposed in the fuel channel and yieldingly biased to a closed position for preventing fuel flow from the fuel chamber and into the upstream region during low engine power operating conditions and which opens via a vacuum created in the upstream region during high power operating conditions.

25. A dual fuel feed system of a carburetor having a body, a fuel-and-air mixing passage through the body for supplying a mixture of fuel-and-air to a combustion engine, a choke valve operatively in an upstream region of the mixing passage for controlling air flow through the mixing passage during cold starting of the engine, a throttle valve operatively in a downstream region of the mixing passage for controlling engine power by controlling the amount of fuel-and-air mixture entering the engine, a venturi region of the mixing passage disposed between the upstream and downstream regions, and a fuel chamber at least in-part carried by the body for supplying fuel to the mixing passage, the dual fuel feed system comprising:

a primary fuel feed passage at least in-part carried by the body and communicating between the venturi region and the fuel chamber for flowing fuel into the venturi region for mixing with air flowing past the choke valve and through the venturi region when the engine is operating at above idle speed conditions;

a supplemental fuel channel at least in-part carried by the body, and communicating between the upstream region and the fuel chamber for supplying fuel into the upstream region for mixing with air flowing through the mixing passage when the engine is operating only at high power conditions; and an air bleed communicating between the fuel channel and atmosphere for entraining air in the flowing supplemental fuel within the fuel channel.

\* \* \* \* \*